(12) United States Patent
Huang et al.

(10) Patent No.: US 10,665,225 B2
(45) Date of Patent: May 26, 2020

(54) SPEAKER ADAPTION METHOD AND APPARATUS, AND STORAGE MEDIUM

(71) Applicant: BAIDU ONLINE NETWORK TECHNOLOGY (BEIJING) CO., LTD., Beijing (CN)

(72) Inventors: Jun Huang, Beijing (CN); Xiangang Li, Beijing (CN); Bing Jiang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 172 days.

(21) Appl. No.: 15/933,064

(22) Filed: Mar. 22, 2018

(65) Prior Publication Data
US 2018/0366109 A1    Dec. 20, 2018

(30) Foreign Application Priority Data
Jun. 16, 2017  (CN) .......................... 2017 1 0457375

(51) Int. Cl.
| G10L 15/00 | (2013.01) |
| G10L 15/07 | (2013.01) |
| G10L 15/22 | (2006.01) |
| G10L 15/26 | (2006.01) |
| G10L 15/06 | (2013.01) |

(52) U.S. Cl.
CPC ............ G10L 15/07 (2013.01); G10L 15/063 (2013.01); G10L 15/22 (2013.01); G10L 15/26 (2013.01)

(58) Field of Classification Search
CPC .................................................... G10L 15/00
USPC ....... 704/234, 7, 2, 226, 233, 235, 224, 201; 707/713, 722, 758
See application file for complete search history.

(56) References Cited

U.S. PATENT DOCUMENTS

| 5,787,394 A | 7/1998 | Bahl et al. |
| 6,253,180 B1 | 6/2001 | Iso |
| 6,275,789 B1 * | 8/2001 | Moser .................... G06F 40/211 704/7 |
| 6,606,595 B1 * | 8/2003 | Chengalvarayan ..... G10L 15/20 704/226 |
| 8,396,859 B2 * | 3/2013 | Green .................... G06F 16/951 707/713 |
| 10,319,076 B2 * | 6/2019 | Denton ..................... G06T 5/00 |

(Continued)

FOREIGN PATENT DOCUMENTS

| CN | 106683680 | 5/2017 |
| JP | H09179580 | 7/1997 |

OTHER PUBLICATIONS

Ioffe et al., "Batch Normalization: Accelerating Deep Network Training by Reducing Internal Covariate Shift," arXiv:1502.03167v3, Mar. 2015, 11 pages.

(Continued)

*Primary Examiner* — Michael Colucci
(74) *Attorney, Agent, or Firm* — Hodgson Russ LLP

(57) ABSTRACT

A speaker adaption method and a speaker adaption apparatus, a device and a storage medium are provided. The method includes: acquiring first speech data of a target speaker; inputting the first speech data to a pre-trained batch normalization (BN) network to be subjected to an adaptive training to acquire a speech recognition model including a speech parameter of the target speaker.

12 Claims, 3 Drawing Sheets

(56) References Cited

U.S. PATENT DOCUMENTS

| | | | |
|---|---|---|---|
| 2011/0060587 A1* | 3/2011 | Phillips | G10L 15/30 |
| | | | 704/235 |
| 2015/0066494 A1* | 3/2015 | Salvador | G06F 3/16 |
| | | | 704/224 |
| 2017/0148433 A1* | 5/2017 | Catanzaro | G10L 15/02 |
| 2018/0011688 A1* | 1/2018 | Wei | G06F 3/167 |
| 2018/0082172 A1* | 3/2018 | Patel | G06N 3/08 |

OTHER PUBLICATIONS

Wang et al., "Unsupervised speaker adaptation of batch normalized acoustic models for robust ASR," IEEE Intenational Conference on Acoustics, Speech and Signal Processing (ICASSP), Mar. 2017, abstract only.

SIPO, First Office Action for CN Application No. 201710457375.4, dated Jan. 3, 2020.

* cited by examiner

SPEAKER ADAPTION METHOD AND APPARATUS, AND STORAGE MEDIUM

CROSS-REFERENCE TO RELATED APPLICATION

This application claims priority to and benefits of Chinese Patent Application Serial No. 201710457375.4, filed with the State Intellectual Property Office of P. R. China on Jun. 16, 2017, the entire content of which is incorporated herein by reference.

FIELD

The present disclosure relates to the field of speech recognition technology, and more particularly to a speaker adaption method, a speaker adaption apparatus and a storage medium.

BACKGROUND

Speaker adaptation technology has been paid more and more attention to in recent years. In such a technology, speaker independent (SI) codebook is modified with specific speaker data for the purpose of acquiring speaker adapted (SA) codebook to improve recognition performance.

In the case that there are enough training data for a certain speaker, speaker dependent (SD) codebook may be acquired by using a traditional training method for the current speaker data. Since speech characteristics of the current speaker may be well reflected by the SD codebook, good performances may usually be realised. However, in some cases, the speaker data are not enough to train a robust SD model, such that the speaker adaption is required to avoid deficient training situations. Compared to the large amount of data needed by the SD codebook for training, only a small amount of data are required by the speaker adaption to achieve an improved performance.

In speaker adaptation, adaptive data are used to adjust the SI codebook to be accorded with the characteristics of the current speaker. Since the SI codebook acquired by the traditional training method is inevitably affected by the training set characteristics, adaptive effect may be less pronounced when the training set is mismatched to the adaptive data. The more the original codebook is speaker-independent, the more quickly the current speaker characteristics are approached by the speaker adaptation. Different models are built for SI codebook and every speaker characteristic in the training set by codebook training in combination with the speaker adaption respectively, thus acquiring a SI codebook with improved speaker independence.

Currently the speaker adaption is mainly realised in two manners. The first manner is the speaker adaptation based on a characteristic layer. The main idea is to construct a transformation method by using the characteristic parameters of speech signals. Speaker-related characteristics are transformed into speaker independent characteristics, and then the speaker independent characteristics are input into the speaker independent model for recognition, thus realising speaker adaptation. The second manner is the speaker adaptation based on a model layer. The speech data of the speaker are used to adjust the speaker independent model, and different acoustical models are acquired by adapting from different speakers and used for recognition, thus realising the speaker adaption.

However, procedure of the speaker adaption described above is complex and usually needs decoding in twice, and the procedure requires a relative long time, thus having a low efficiency. Moreover, a contradiction between a limited speech data and a large number of parameters required by the adaption may result in a poor performance.

SUMMARY

Embodiments of the present disclosure provide a speaker adaption method. The method includes: acquiring first speech data of a target speaker; inputting the first speech data to a pre-trained batch normalization (BN) network to be subjected to an adaptive training to acquire a speech recognition model including a speech parameter of the target speaker.

Embodiments of the present disclosure provide a speaker adaption apparatus. The apparatus includes: a speech data acquiring module configured to acquire first speech data of a target speaker; a model training module configured to input the first speech data to a pre-trained batch normalization (BN) network to be subjected to an adaptive training to acquire a speech recognition model including a speech parameter of the target speaker.

Embodiments of the present disclosure provide a device. The device includes: one or more processors; a memory having stored therein one or more computer programs that, when executed by the one or more processors, causes the one or more processors to perform a speaker adaption method according to any embodiment of the present disclosure.

Embodiments of the present disclosure provide a computer-readable storage medium having stored therein computer programs that, when executed by a processor of a terminal, causes the terminal to perform a speaker adaption method according to any embodiment of the present disclosure.

DETAILED DESCRIPTION

Figure 1:
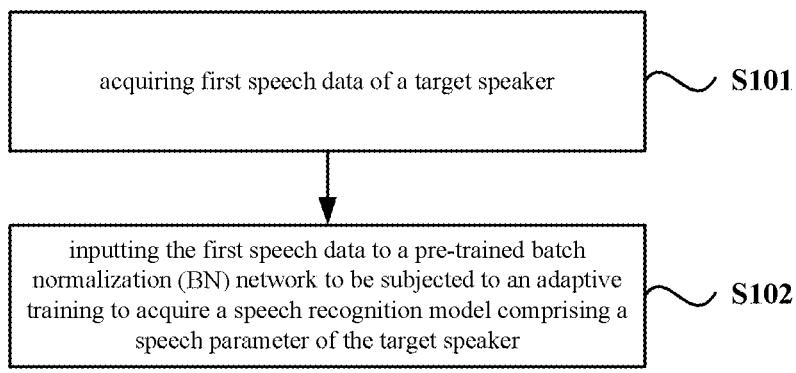
FIG. 1 is a flow chart of a speaker adaption method according to Embodiment 1 of the present disclosure.

Reference will be made in detail to embodiments of the present disclosure. The embodiments described herein with reference to drawings are explanatory, illustrative, and configured to generally understand the present disclosure. The embodiments shall not be construed to limit the present disclosure.

Moreover, it should also be noted that, for the convenience of description, only parts related to the present disclosure are shown in the drawings, rather than the entire contents of the present disclosure. Before discussing the exemplary embodiments in more detail, it should be mentioned that some exemplary embodiments are described as processes or methods depicted as a flow chart. Although the flow chart describes various operations (or steps) as sequential processes, many of these operations (or steps) may be performed in parallel or concurrently. In addition, the order of operations (or steps) can be rearranged. Processing may be terminated if operations are completed, but additional steps not included in the drawings may also be added into the processing. The processing may correspond to methods, functions, procedures, subroutines, subprograms and the like.

In embodiments of a first aspect of the present disclosure, a speaker adaption method is provided, including:
acquiring first speech data of a target speaker;
inputting the first speech data to a pre-trained batch normalization (BN) network to be subjected to an adaptive training to acquire a speech recognition model comprising a speech parameter of the target speaker.

With the speaker adaption method according to embodiments of the present disclosure, by inputting the first speech data to the pre-trained BN network to be subjected to the adaptive training to acquire the speech recognition model including the speech parameter of the target speaker, procedure of speaker adaption may be simplified, complexity of the speaker adaption may be reduced and performance of the speaker adaption may be improved.

In an embodiment of the present disclosure, the method further includes:
acquiring the speech parameter of the target speaker according to second speech data of the target speaker;
inputting the speech parameter of the target speaker into the speech recognition model for recognition to acquire corresponding text information.

In an embodiment of the present disclosure, the method further includes:
acquiring speech data of a reference speaker;
performing a training according to the speech data of the reference speaker to acquire the BN network comprising a global speech parameter and the speech recognition model comprising the global speech parameter.

In an embodiment of the present disclosure, inputting the first speech data to the pre-trained BN network to be subjected to the adaptive training to acquire the speech recognition model comprising the speech parameter of the target speaker includes:
inputting the first speech data to the BN network to acquire the speech parameter of the target speaker,
replacing the global speech parameter with the speech parameter of the target speaker to acquire the speech recognition model comprising the speech parameter of the target speaker.

In an embodiment of the present disclosure, inputting the speech parameter of the target speaker into the speech recognition model for recognition to acquire the corresponding text information includes:
calculating weights for the speech parameter of the target speaker and the global speech parameter;
inputting the weights into the speech recognition model for recognition to acquire the corresponding text information.

In an embodiment of the present disclosure, the speech parameter is at least one of a variance and an average.

With the speaker adaption method according to embodiments of the present disclosure, by inputting the first speech data to the pre-trained BN network to be subjected to the adaptive training to acquire the speech recognition model including the speech parameter of the target speaker, procedure of speaker adaption may be simplified, complexity of the speaker adaption may be reduced and performance of the speaker adaption may be improved.

In embodiments of a second aspect of the present disclosure, a speaker adaption apparatus is provided, including:
one or more processors;
a memory;
one or more software modules stored in the memory and executable by the one or more processors, and comprising:
a speech data acquiring module configured to acquire first speech data of a target speaker;
a model training module configured to input the first speech data to a pre-trained batch normalization (BN) network to be subjected to an adaptive training to acquire a speech recognition model comprising a speech parameter of the target speaker.

With the speaker adaption apparatus according to embodiments of the present disclosure, by inputting the first speech data to the pre-trained BN network to be subjected to the adaptive training to acquire the speech recognition model including the speech parameter of the target speaker, procedure of speaker adaption may be simplified, complexity of the speaker adaption may be reduced and performance of the speaker adaption may be improved.

In an embodiment of the present disclosure, the apparatus further includes:
a speech recognition module configured to acquire the speech parameter of the target speaker according to second speech data of the target speaker, and acquire the corresponding text information by inputting the speech parameter of the target speaker into the speech recognition model for recognition.

In an embodiment of the present disclosure, the speech data acquiring module is further configured to acquire speech data of a reference speaker; and the model training module is further configured to perform a training according to the speech data of the reference speaker to acquire the BN network comprising a global speech parameter and the speech recognition model comprising the global speech parameter.

In an embodiment of the present disclosure, the model training module is specifically configured to:
input the first speech data into the BN network to acquire the speech parameter of the target speaker,
replace the global speech parameter with the speech parameter of the target speaker to acquire the speech recognition model comprising the speech parameter of the target speaker.

In an embodiment of the present disclosure, the speech recognition module is specifically configured to:
calculate weights for the speech parameter of the target speaker and the global speech parameter;
input the weights into the speech recognition model for recognition to acquire the corresponding text information.

In an embodiment of the present disclosure, the speech parameter is at least one of a variance and an average.

In embodiments of a third aspect of the present disclosure, a computer-readable storage medium is provided, having stored therein computer programs that, when executed by a processor of a terminal, cause the terminal to perform a speaker adaption method, the method including:
acquiring first speech data of a target speaker;
inputting the first speech data to a pre-trained batch normalization (BN) network to be subjected to an adaptive training to acquire a speech recognition model comprising a speech parameter of the target speaker.

EMBODIMENT 1

FIG. 1 is a flow chart of a speaker adaption method according to Embodiment 1 of the present disclosure. This embodiment is suitable for a speaker adaption situation, and the speaker adaption method may be performed by a speaker adaption apparatus provided by embodiments of the present disclosure. Such an apparatus may be realised in a software and/or hardware manner and may be integrated in a terminal device or an application end of a terminal device. Specifically, the terminal device may be, but not limited to, a mobile terminal such as a tablet personal computer or a mobile phone.

Specifically, the application end may be a plug-in element of a client end embedded in a terminal device or a plug-in element of an operating system of the terminal device. The application end may be used together with a client end of the speaker adaption embedded in a terminal device or an application program of the speaker adaption in an operating system of the terminal device. The application end may also be an independent client end providing speaker adaption in the terminal device, which is not limited herein.

As shown in FIG. 1, the speaker adaption method includes following blocks.

In block S101, first speech data of a target speaker are acquired.

Specifically, the speech data may be original speech signals or speech characteristic data acquired by processing the original speech signals.

Specifically, the speech data may be acquired by a speech inputting device or a recording device of a terminal device.

In block S102, the first speech data are input to a pre-trained batch normalization (BN) network to be subjected to an adaptive training to acquire a speech recognition model including a speech parameter of the target speaker.

Specifically, the speech parameter is at least one of a variance and an average, which may be acquired from the BN network training by using the first speech data.

Specifically, the speech data may be divided into m frames, the m frames of the speech data are input into the BN network, and the variance and the average may be acquired with a BN conversion formula in the BN network, the speech recognition model including the variance and the average may be acquired as well:

$$\mu_B = \frac{1}{m}\sum_{i=1}^{m} x_i$$

$$\sigma_B^2 = \frac{1}{m}\sum_{i=1}^{m} (x_i - \mu_B)^2$$

where m is a frame number of the speech data, $x_i$ is the $i^{th}$ frame of the speech data, $\mu_B$ is the average and $\sigma_B^2$ is the variance.

Since the adaption of the BN network does not require an additional layer, the adaptive procedure is simpler. Moreover, the average and the variance acquired from the BN network are both one-dimensional vectors, such that fewer parameters are needed to be adjusted during the adaption. The speech parameters (i.e., the average and the variance) of the present embodiment are acquired by adaptive training of the pre-trained BN network without decoding in twice.

Therefore, in the embodiment, by inputting the first speech data to the pre-trained BN network to be subjected to the adaptive training to acquire the speech recognition model including the speech parameter of the target speaker, procedure of speaker adaption may be simplified, complexity of the speaker adaption may be reduced and performance of the speaker adaption may be improved.

EMBODIMENT 2

Figure 2:
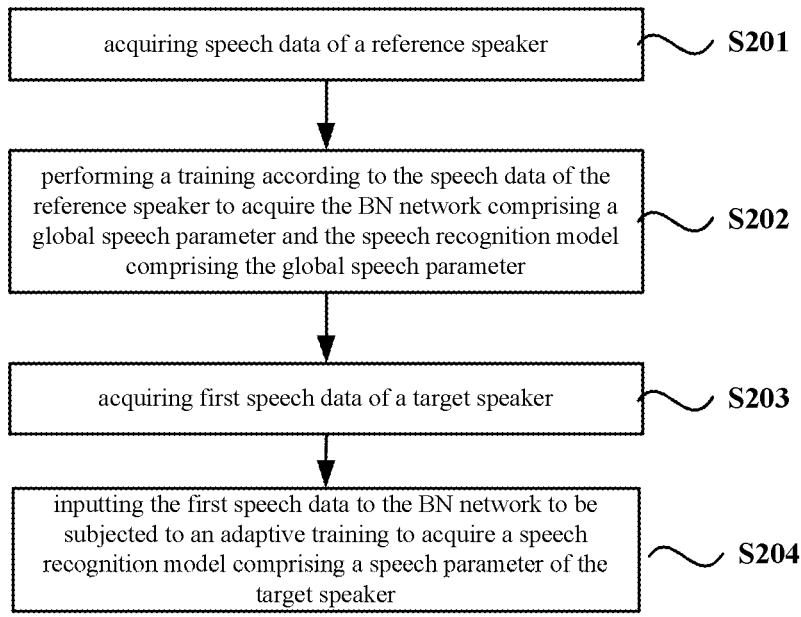
FIG. 2 is a flow chart of a speaker adaption method according to Embodiment 2 of the present disclosure.

FIG. 2 is a flow chart of a speaker adaption method according to Embodiment 2 of the present disclosure. This embodiment is optimized according to the above embodiment. In this embodiment, the method further includes acquiring speech data of a reference speaker; performing a training according to the speech data of the reference speaker to acquire the BN network including a global speech parameter and the speech recognition model including the global speech parameter.

Accordingly, the method of the present embodiment specifically includes following blocks.

In block S201, speech data of a reference speaker are acquired.

Specifically, the number of the reference speaker(s) may be one or more.

In block S202, a training is performed according to the speech data of the reference speaker to acquire the BN network including a global speech parameter and the speech recognition model including the global speech parameter.

Specifically, the global speech parameter is at least one of a variance and an average. Specifically, global speech parameters of every reference speaker are acquired by the above BN conversion formula, and an average global speech parameter may be calculated as the global speech parameter of the BN network. Moreover, the speech recognition model including such a global speech parameter of the BN network may be acquired by training.

In block S203, first speech data of a target speaker are acquired.

In block S204, the first speech data are input to a BN network to be subjected to an adaptive training to acquire a speech recognition model including a speech parameter of the target speaker.

Specifically, the first speech data are input to the BN network to acquire the speech parameter of the target speaker, and the global speech parameter is replaced with the speech parameter of the target speaker to acquire the speech recognition model including the speech parameter of the target speaker. Alternatively, in order to improve speech recognition performance, weights for the speech parameter of the target speaker and the global speech parameter may be used as a final speech parameter of the target speaker, and then the speech parameter is replaced with the global speech parameter in the speech recognition model, thus acquiring the speech recognition model including the speech parameter of the target speaker.

Alternatively, in the case of more than one target speakers, each target speaker may have a certain speech recognition model. In these speech recognition models of all the target speakers, except for the speech parameters (i.e., the average and the variance), other parameters are all the same.

In the embodiment of the present disclosure, by performing the training according to the speech data of the reference speaker to acquire the BN network including a global speech parameter and the speech recognition model including the global speech parameter, and then inputting the first speech data of the target speaker to the BN network to be subjected to the adaptive training to acquire the speech recognition model including the speech parameter of the target speaker, procedure of speaker adaption may be simplified, complexity of the speaker adaption may be reduced and performance of the speaker adaption may be improved.

EMBODIMENT 3

Figure 3:
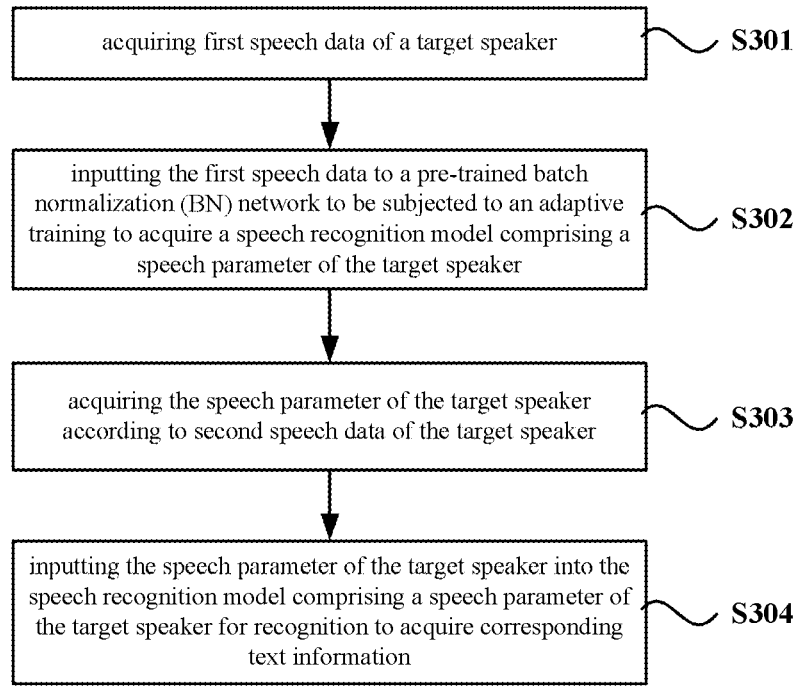
FIG. 3 is a flow chart of a speaker adaption method according to Embodiment 3 of the present disclosure.

FIG. 3 is a flow chart of a speaker adaption method according to Embodiment 3 of the present disclosure. This embodiment is optimized according to the above embodiments. In this embodiment, the method further includes acquiring the speech parameter of the target speaker according to second speech data of the target speaker; inputting the speech parameter of the target speaker into the speech recognition model for recognition to acquire corresponding text information.

Accordingly, the method according to this embodiment of the present disclosure includes following blocks.

In block S301, first speech data of a target speaker are acquired.

In block S302, the first speech data are input to a pre-trained BN network to be subjected to an adaptive training to acquire a speech recognition model including a speech parameter of the target speaker.

In block S303, the speech parameter of the target speaker is acquired according to second speech data of the target speaker.

Specifically, the first speech data and the second speech data may be the same or different.

Specifically, the second speech data are input to the BN network to be subjected to an adaptive training to acquire the speech parameter of the target speaker, in which the speech parameter is at least one of a variance and an average.

In block S304, the speech parameter of the target speaker into the speech recognition model for recognition to acquire corresponding text information.

Specifically, the speech parameter of the target speaker is directly input the speech recognition model for recognition, thus acquiring the corresponding text information. Meanwhile, weights for the speech parameter of the target speaker and the global speech parameter are calculated, and the weights are input into the speech recognition model for recognition to acquire the corresponding text information. For example, a weight corresponding to the speech parameter of the target speaker is w1, a weight corresponding to the global speech parameter is w2, the speech parameter of the target speaker is x1 and the global speech parameter is x2, such that the corresponding weight calculation in this case is x1*w1+x2*w2.

In this embodiment of the present disclosure, the first speech data of the target speaker are input to the pre-trained BN network to be subjected to the adaptive training, thus acquiring the speech recognition model, and the BN network has a high adaption performance. In this embodiment, by inputting the second speech parameter of the target speaker into the speech recognition model including the speech parameter of the target speaker for recognition to acquire corresponding text information, efficiency for speech recognition may be improved.

EMBODIMENT 4

Figure 4:
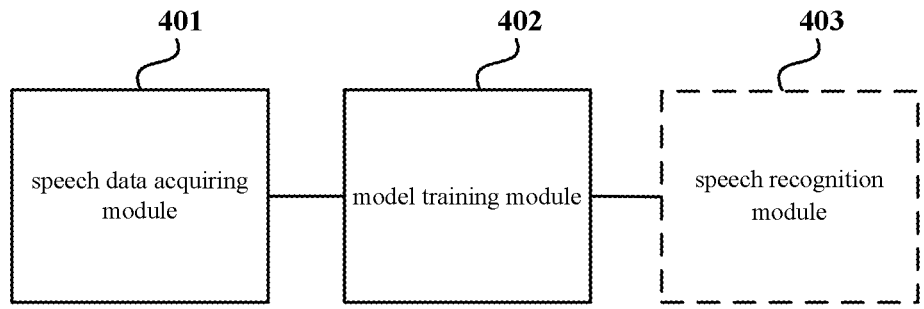
FIG. 4 is a block diagram showing a speaker adaption apparatus according to Embodiment 4 of the present disclosure.

FIG. 4 is a block diagram showing a speaker adaption apparatus according to Embodiment 4 of the present disclosure. Such an apparatus may be realised in a software and/or hardware manner and integrated in a terminal device or an application end of a terminal device. Specifically, the terminal device may be, but not limited to, a mobile terminal such as a tablet personal computer or a mobile phone.

Specifically, the application end may be a plug-in element of a client end embedded in a terminal device or a plug-in element of an operating system of the terminal device. The application end may be used together with a client end of the speaker adaption embedded in a terminal device or an application program of the speaker adaption in an operating system of the terminal device. The application end may also be an independent client end providing speaker adaption in the terminal device, which is not limited herein.

As shown in FIG. 4, the apparatus includes one or more processors; a memory; one or more software modules stored in the memory and executable by the one or more processors, and including a speech data acquiring module 401 and a model training module 402.

Specifically, the speech data acquiring module 401 is configured to acquire first speech data of a target speaker.

The model training module 402 is configured to input the first speech data to a BN network to be subjected to an adaptive training to acquire a speech recognition model including a speech parameter of the target speaker.

The speaker adaption apparatus according to the embodiment of the present disclosure is used for performing the speaker adaption method according to any one of the above embodiments, technology principles and technology effects thereof are similar, which are not described in detail here.

Based on the above embodiments, the apparatus may further include a speech recognition module 403.

The speech recognition module 403 is configured to acquire the speech parameter of the target speaker according to second speech data of the target speaker, and acquire corresponding text information by inputting the speech parameter of the target speaker into the speech recognition model for recognition.

Based on the above embodiments, the speech data acquiring module 401 is further configured to acquire speech data of a reference speaker.

The model training module 402 is further configured to perform a training according to the speech data of the reference speaker to acquire the BN network including a global speech parameter and the speech recognition model including the global speech parameter.

Based on the above embodiments, the model training module 402 is specifically configured to: input the first speech data into the BN network to acquire the speech parameter of the target speaker, and replace the global speech parameter with the speech parameter of the target speaker to acquire the speech recognition model including the speech parameter of the target speaker.

Based on the above embodiments, the speech recognition module 403 is specifically configured to: calculate weights for the speech parameter of the target speaker and the global speech parameter; and input the weights into the speech recognition model for recognition to acquire the corresponding text information.

Based on the above embodiments, the speech parameter is at least one of a variance and an average.

The apparatus provided in the above embodiments of the present disclosure may perform the speaker adaption method provide in any embodiment of the present disclosure, and has corresponding function modules for performing the speaker adaption method and benefit effects.

EMBODIMENT 5

Figure 5:
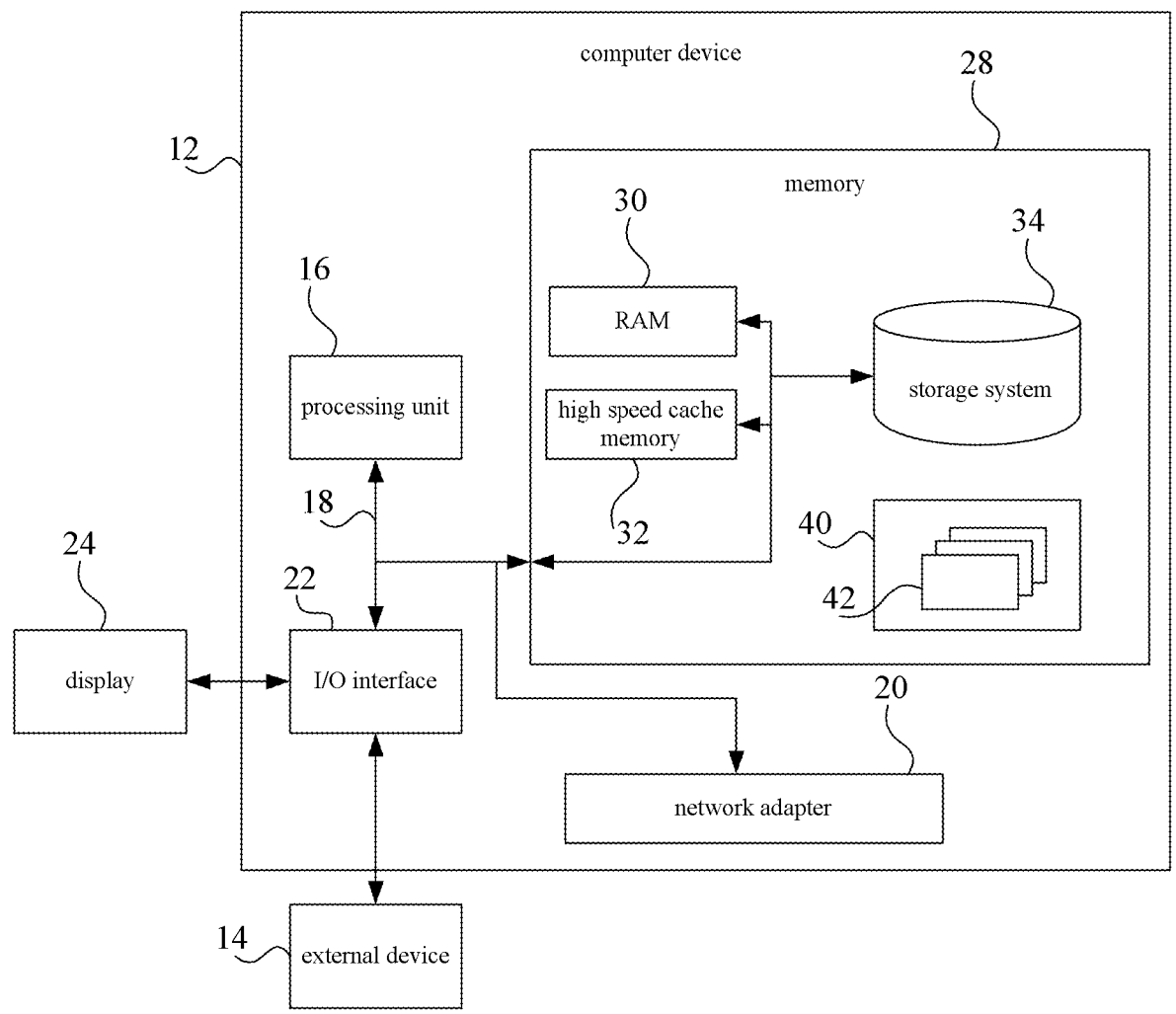
FIG. 5 is a block diagram showing a computer device according to Embodiment 5 of the present disclosure.

FIG. 5 is a block diagram showing a computer device according to Embodiment 5 of the present disclosure. FIG. 5 illustrates a block diagram of a computer device 12 according to an embodiment of the present disclosure, which is suitable for implement embodiments of the present disclosure as described hereinbefore. The computer device 12 shown in FIG. 5 is merely an example, which should not be considered as a limitation of function and scope of embodiments of the present disclosure.

As illustrated in FIG. 5, the computer device 12 may be represented via a general computer device form. Components of the computer device 12 may include, but are not limited to, one or more processors or processing units 16, a system memory 28, a bus 18 connected with various system components including the system memory 28 and the processing units 16.

The bus 18 represents one or more of several types of bus structures, including a memory bus or a memory controller, a peripheral bus, a graphics acceleration port, a processor, or a local bus using any of a variety of bus structures. For example, these architectures may be, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (hereinafter referred to as PCI) bus.

The computer device 12 typically includes a variety of computer system readable media. These media may be any available media accessible by the computer device 12 and include both volatile and non-volatile media, removable and non-removable media.

The system memory 28 may include a computer system readable medium in the form of volatile memory, such as a random access memory 30 (hereinafter referred to as RAM) and/or a high speed cache memory 32. The computer device 12 may further include other removable or non-removable, volatile or non-volatile computer system storage media. By way of example only, the storage system 34 may be configured to read and write a non-removable and non-volatile magnetic media (not shown in FIG. 5, commonly referred to as a "hard drive"). Although not shown in FIG. 5, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media may be provided. In these cases, each driver may be connected to the bus 18 via one or more data medium interfaces. The memory 28 may include at least one program product. The program product has a set (such as, at least one) of program modules configured to perform the functions of various embodiments of the present disclosure.

A program/utility 40 having a set (at least one) of the program modules 42 may be stored in, for example, the memory 28. The program modules 42 include, but are not limited to, an operating system, one or more application programs, other programs modules, and program data. Each of these examples, or some combination thereof, may include an implementation of a network environment. The program modules 42 generally perform the functions and/or methods in the embodiments described herein.

The computer device 12 may also communicate with one or more external devices 14 (such as, a keyboard, a pointing device, a display 24, etc.). Furthermore, the computer device 12 may also communicate with one or more communication devices enabling a user to interact with the computer device 12 and/or other devices (such as a network card, modem, etc.) enabling the computer device 12 to communicate with one or more computer devices. This communication can be performed via an input/output (I/O) interface 22. Moreover, the computer device 12 may communicate with one or more networks (such as a local area network (hereafter referred to as LAN), a wide area network (hereafter referred to as WAN) and/or a public network such as an Internet) through a network adapter 20. As shown in FIG. 9, the network adapter 20 communicates with other modules of the computer device 12 over the bus 18. It should be understood that, although not shown in FIG. 5, other hardware and/or software modules may be used in connection with the computer device 12. The hardware and/or software include, but are not limited to, microcode, device drivers, redundant processing units, external disk drive arrays, RAID systems, Drive and data backup storage system.

The processing unit 16 is configured to execute various functional applications and data processing by running programs stored in the system memory 28, for example, implementing the speaker adaption method provided in embodiments of the present disclosure. The method includes:
acquiring first speech data of a target speaker;
inputting the first speech data to a pre-trained batch normalization (BN) network to be subjected to an adaptive training to acquire a speech recognition model including a speech parameter of the target speaker.

Further, the method further includes:
acquiring the speech parameter of the target speaker according to second speech data of the target speaker;
inputting the speech parameter of the target speaker into the speech recognition model for recognition to acquire corresponding text information.

Further, the method further includes:
acquiring speech data of a reference speaker;
performing a training according to the speech data of the reference speaker to acquire the BN network including a global speech parameter and the speech recognition model including the global speech parameter.

Further, inputting the first speech data to a pre-trained BN network to be subjected to an adaptive training to acquire a speech recognition model including a speech parameter of the target speaker includes:
inputting the first speech data to the BN network to acquire the speech parameter of the target speaker,
replacing the global speech parameter with the speech parameter of the target speaker to acquire the speech recognition model including the speech parameter of the target speaker.

Further, inputting the speech parameter of the target speaker into the speech recognition model for recognition to acquire corresponding text information includes:
calculating weights for the speech parameter of the target speaker and the global speech parameter;
inputting the weights into the speech recognition model for recognition to acquire the corresponding text information.

Further, the speech parameter is at least one of a variance and an average.

EMBODIMENT 6

Embodiment 6 of the present disclosure provides a computer-readable storage medium having stored therein computer programs that, when executed by a processor, causes the processor to perform the speaker adaption method provided in embodiments of the present disclosure. The method includes:
acquiring first speech data of a target speaker;
inputting the first speech data to a pre-trained batch normalization (BN) network to be subjected to an adaptive training to acquire a speech recognition model including a speech parameter of the target speaker.

Further, the method further includes:

acquiring the speech parameter of the target speaker according to second speech data of the target speaker;

inputting the speech parameter of the target speaker into the speech recognition model for recognition to acquire corresponding text information.

Further, the method further includes:

acquiring speech data of a reference speaker;

performing a training according to the speech data of the reference speaker to acquire the BN network including a global speech parameter and the speech recognition model including the global speech parameter.

Further, inputting the first speech data to a pre-trained BN network to be subjected to an adaptive training to acquire a speech recognition model including a speech parameter of the target speaker includes:

inputting the first speech data to the BN network to acquire the speech parameter of the target speaker, replacing the global speech parameter with the speech parameter of the target speaker to acquire the speech recognition model including the speech parameter of the target speaker.

Further, inputting the speech parameter of the target speaker into the speech recognition model for recognition to acquire corresponding text information includes:

calculating weights for the speech parameter of the target speaker and the global speech parameter;

inputting the weights into the speech recognition model for recognition to acquire the corresponding text information.

Further, the speech parameter is at least one of a variance and an average.

The above computer-readable storage medium including the computer executable instruction may adopt any combination of one or more computer readable media. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing a program. The program may be used by an instruction executed system, apparatus or device, or a connection thereof.

The computer readable signal medium may include a data signal propagating in baseband or as part of a carrier which carries a computer readable program code. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport a program used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional Procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine the different embodiments or examples described in this specification, or combine the features of different embodiments or examples.

In addition, terms such as "first" and "second" are used herein for purposes of description and are not intended to indicate or imply relative importance or significance. Thus, the feature defined with "first" and "second" may include one or more this feature. In the description of the present disclosure, "a plurality of" means two or more than two, for example, two or three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the order of execution is different from what is shown or discussed, including executing functions in a substantially simultaneous manner or in an opposite order according to the related functions. These and other aspects should be understood by those skilled in the art.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A speaker adaption method, comprising:
acquiring speech data of a reference speaker;
performing a training according to the speech data of the reference speaker to acquire a batch normalization (BN) network comprising a global speech parameter and a speech recognition model comprising the global speech parameter;
acquiring first speech data of a target speaker;
inputting the first speech data to the BN network to acquire a speech parameter of the target speaker, and replacing the global speech parameter with the speech parameter of the target speaker to acquire a speech recognition model comprising the speech parameter of the target speaker.

2. The method according to claim 1, further comprising:
acquiring the speech parameter of the target speaker according to second speech data of the target speaker;
inputting the speech parameter of the target speaker into the speech recognition model for recognition to acquire corresponding text information.

3. The method according to claim 1, wherein inputting the speech parameter of the target speaker into the speech recognition model for recognition to acquire the corresponding text information comprises:
calculating weights for the speech parameter of the target speaker and the global speech parameter;
inputting the weights into the speech recognition model for recognition to acquire the corresponding text information.

4. The method according to claim 1, wherein the speech parameter is at least one of a variance and an average.

5. A speaker adaption apparatus, comprising:
one or more processors;
a memory;
one or more software modules stored in the memory and executable by the one or more processors, and comprising:
a speech data acquiring module configured to acquire speech data of a reference speaker; and
a model training module configured to perform a training according to the speech data of the reference speaker to acquire a batch normalization (BN) network comprising a global speech parameter and a speech recognition model comprising the global speech parameter, wherein:
the speech data acquiring module is further configured to acquire first speech data of a target speaker; and
the model training module is further configured to input the first speech data to the BN network to acquire a speech parameter of the target speaker, replace the global speech parameter with the speech parameter of the target speaker to acquire a speech recognition model comprising 6 the speech parameter of the target speaker.

6. The apparatus according to claim 5, further comprising:
a speech recognition module configured to acquire the speech parameter of the target speaker according to second speech data of the target speaker, and acquire the corresponding text information by inputting the speech parameter of the target speaker into the speech recognition model for recognition.

7. The apparatus according to claim 5, wherein the speech recognition module is specifically configured to:
calculate weights for the speech parameter of the target speaker and the global speech parameter;
input the weights into the speech recognition model for recognition to acquire the corresponding text information.

8. The apparatus according to claim 5, wherein the speech parameter is at least one of a variance and an average.

9. A computer-readable storage medium having stored therein computer programs that, when executed by a processor of a terminal, cause the terminal to perform a speaker adaption method, the method comprising:
acquiring speech data of a reference speaker;
performing a training according to the speech data of the reference speaker to acquire a batch normalization (BN) network comprising a global speech parameter and a speech recognition model comprising the global speech parameter;
acquiring first speech data of a target speaker;
inputting the first speech data to the BN network to acquire a speech parameter of the target speaker, and replacing the global speech parameter with the speech parameter of the target speaker to acquire a speech recognition model the speech parameter of the target speaker.

10. The computer-readable storage medium according to claim 9, wherein the method further comprises:
acquiring the speech parameter of the target speaker according to second speech data of the target speaker;
inputting the speech parameter of the target speaker into the speech recognition model for recognition to acquire corresponding text information.

11. The computer-readable storage medium according to claim 9, wherein inputting the speech parameter of the target speaker into the speech recognition model for recognition to acquire the corresponding text information comprises:
calculating weights for the speech parameter of the target speaker and the global speech parameter;
inputting the weights into the speech recognition model for recognition to acquire the corresponding text information.

12. The computer-readable storage medium according to claim 9, wherein the speech parameter is at least one of a variance and an average.

* * * * *